(12) United States Patent
Huang et al.

(10) Patent No.: US 9,654,343 B2
(45) Date of Patent: May 16, 2017

(54) SYSTEM AND METHOD FOR MANAGING SERVICE CHARACTERISTICS

(71) Applicant: Huawei Technologies Co., Ltd., Shenzhen, Guangdong (CN)

(72) Inventors: Haijun Huang, Shenzhen (CN); Puchao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 14/286,021

(22) Filed: May 23, 2014

(65) Prior Publication Data

US 2014/0258545 A1    Sep. 11, 2014

Related U.S. Application Data

(63) Continuation of application No. PCT/CN2012/084274, filed on Nov. 8, 2012.

(30) Foreign Application Priority Data

Nov. 23, 2011   (CN) .......................... 2011 1 0376415

(51) Int. Cl.
*G06F 15/173* (2006.01)
*H04L 12/24* (2006.01)
*H04L 29/08* (2006.01)

(52) U.S. Cl.
CPC .......... *H04L 41/0896* (2013.01); *H04L 41/50* (2013.01); *H04L 67/02* (2013.01)

(58) Field of Classification Search
CPC ...... H04L 41/0896; H04L 41/50; H04L 67/02

(Continued)

(56) References Cited

U.S. PATENT DOCUMENTS

2010/0131643 A1   5/2010  Okayama
2010/0241485 A1*  9/2010  Bajaj ..................... G06F 9/4428
                                                           705/7.25

(Continued)

FOREIGN PATENT DOCUMENTS

CN          101051076 A      10/2007
CN          101364289 A       2/2009

(Continued)

*Primary Examiner* — Wing F Chan
*Assistant Examiner* — Joseph Maniwang
(74) *Attorney, Agent, or Firm* — Leydig, Voit & Mayer, Ltd.

(57) ABSTRACT

The present invention provides a system and a method for managing an expanded service characteristic bundle, which solve the problem that the WAB of a Web layer lacks the capabilities of modularization. The method comprises: obtaining a basic characteristic bundle identifier and a resource request path according to a Web resource request, wherein, the resource request path is the path of a resource required to be obtained in a service characteristic bundle; obtaining existing basic characteristic bundles and service characteristic bundles, and screening out the service characteristic bundle having a mounting identifier identical to the basic characteristic bundle identifier obtained from the Web resource request; storing the mounting identifier in the service characteristic bundle for designating a basic characteristic bundle to which the service characteristic bundle is to be mounted; and loading the screened service characteristic bundle according to the resource request path, and returning the obtained resource.

15 Claims, 3 Drawing Sheets

(58) Field of Classification Search
USPC .......................................................... 709/226
See application file for complete search history.

(56) References Cited

U.S. PATENT DOCUMENTS

2013/0061217 A1* 3/2013 Charters .................. G06F 8/60
717/174
2013/0145381 A1* 6/2013 Nobuoka ................ G06F 9/541
719/328

FOREIGN PATENT DOCUMENTS

| CN | 101977196 A | 2/2011 |
| CN | 102024204 A | 4/2011 |
| CN | 102404149 A | 4/2012 |

\* cited by examiner

SYSTEM AND METHOD FOR MANAGING SERVICE CHARACTERISTICS

CROSS-REFERENCE TO RELATED APPLICATIONS

The present application is a continuation of International Patent Application No. PCT/CN2012/084274, filed on Nov. 8, 2012, which claims the priority of Chinese Patent Application No. 201110376415.5, filed on Nov. 23, 2011, both of which are hereby incorporated by reference in their entireties.

FIELD OF THE INVENTION

The present invention relates to the field of computers, and more particularly, to systems and methods for managing a service characteristic bundle.

BACKGROUND OF THE INVENTION

The J2EE Web application technology has already been widely adopted in the field of enterprise-level application, but nowadays, for the continuously increasing of scale and complexity of enterprise-level software, modularized design and development of software and a "front shop back factory" type software architecture which supports releasing according to service characteristics are gradually becoming the trend of development. Modularized development and design of Web applications are objectives pursued by software architects and developers all the time, but lack the support of unified specification and architecture.

The OSGi enterprise-level specification (OSGi 4.2) provides a good support for running the J2EE Web applications under a plug-in environment, and formulates a specification (Web Applications Specification) that a plug-in runtime environment supports Web applications, which makes the Web applications have the capabilities of modularized development and running and dynamic variability and expandability. The J2EE Web application may be smoothly migrated to run under the OSGi architecture, and the existing application may run under the OSGi architecture without great adjustment, so that the cost is greatly reduced. A service logic layer (Enterprise Bean) has the capabilities of modularization and dynamic expandability.

Modularization of a web layer of a service characteristic bundle is realized by using Fragment in the prior art, specifically, the Web layer of the service characteristic bundle is packaged into the Fragment and attached to a basic WAB (Web Application Bundle, WAB), so that when the basic WAB is started, the Web resource in the Fragment is loaded at the same time, but the Fragment does not have a life cycle and thus dynamic expansion can not be realized; if the Fragment depends on a class which is not depended on by the basic WAB, the Fragment can not be added to runtime environment in a running state, and the basic WAB must be restarted; moreover, once the Fragment is loaded to run, the Fragment can not be dynamically unloaded; and the basic WAB needs to be restarted if the Fragment is required to be unloaded, which will affect normal use of other service characteristics.

In the single sign on (Single Sign On, SSO) scheme of the prior art, since each independent service characteristic WAB must comprise all resources so that it may run, then the problem that the same resource simultaneously exists in different service characteristic WABs exists in a complete application, which leads to the repeated deployment of the resource; and if a certain basic resource is required to be updated, all involved service characteristic bundles are required to be synchronously modified, which greatly increases complexity and maintenance cost of the applications.

SUMMARY OF THE INVENTION

The present invention provides a system and a method for managing an expanded service characteristic bundle, which solve the problem that the WAB of a Web layer lacks the capabilities of modularization and dynamic expansion and provide a more flexible and efficient solution for Web development of an enterprise.

The present invention relates to a management method based on an expanded service WAB, comprising:
obtaining, according to a Web resource request, a basic characteristic bundle identifier and a resource request path, wherein, the resource request path is a path of a resource to be obtained in a service characteristic bundle; and obtaining existing basic characteristic bundles and service characteristic bundles, and screening out the service characteristic bundle having a mounting identifier identical to the basic characteristic bundle identifier obtained from the Web resource request; wherein the mounting identifier is stored in the service characteristic bundle for designating a basic characteristic bundle to which the service characteristic bundle is to be mounted; and loading the screened service characteristic bundle according to the resource request path, and returning the obtained resource.

The present invention relates to a management system based on an expanded service WAB, comprising:
a service characteristic module, configured to store a service characteristic bundle, the service characteristic bundle has a mounting identifier indicating a basic characteristic bundle to which the service characteristic bundle is to be mounted; and a basic characteristic module, configured to store a basic characteristic bundle, the basic characteristic bundle comprises a basic resource required by the service characteristic bundle; and a loading module, configured to receive a Web resource request, and obtain a basic characteristic bundle identifier and a resource request path, the resource request path is a path of a resource to be obtained in the service characteristic bundle, and load the basic characteristic bundle according to the Web resource request and call a delegation module to further complete loading of the resource when the required resource is not loaded in the basic characteristic bundle; and the delegation module, configured to obtain existing basic characteristic bundles and service characteristic bundles, and screen out the service characteristic bundle having the mounting identifier identical to the basic characteristic bundle identifier obtained from the Web resource request, and load the screened service characteristic bundle based on the resource request path, and obtain and return the resource to the loading module.

The present invention relates to a loading device for an expanded service WAB, comprising:
an import module, configured to receive a basic characteristic bundle identifier and a resource request path of a resource in a service characteristic bundle, which are transmitted by a loading module; and a screening module, configured to screen out the service characteristic bundle having a mounting identifier identical to the basic characteristic bundle identifier obtained from the obtained existing basic characteristic bundles and service characteristic bundles, the mounting identifier is stored in the service characteristic bundle for designating a basic characteristic bundle to which the service characteristic bundle is to be mounted; and a resource obtaining module, configured to obtain the resource of the service characteristic bundle according to the designated resource request path and return the obtained resource to the loading module.

The present invention realizes modularization by dividing the Web layer into the basic characteristic bundle (basic WAB) and the service characteristic bundle (service WAB), and adding the mounting identifier to the service characteristic bundle, and combing the delegation module to realize the dynamic expansion of the service characteristic bundle.

EMBODIMENTS OF THE INVENTION

Figure 1:
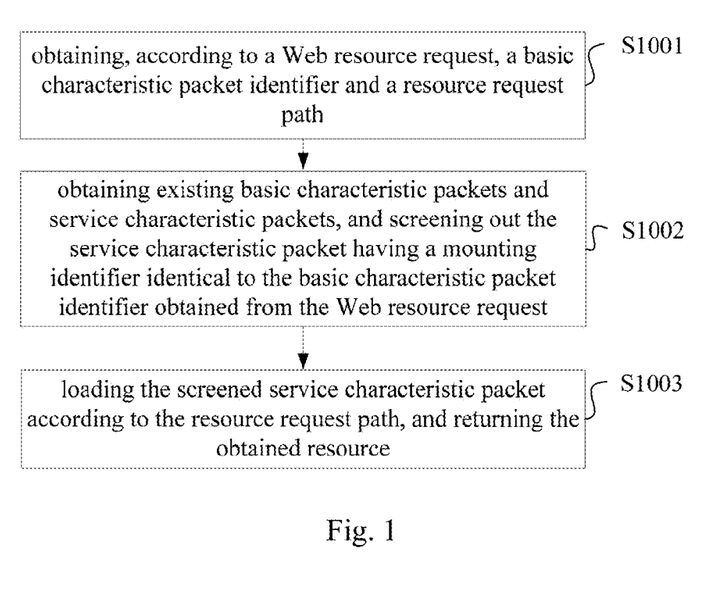
FIG. 1 is a flow schematic view of a method for managing service characteristics of the present invention.

A method embodiment for modularized management of service characteristics of the present invention, as shown in FIG. 1, comprises the following steps.

S1001, obtaining, according to a Web resource request, a basic characteristic bundle identifier and a resource request path, wherein, the resource request path is a path of a resource to be obtained in a service characteristic bundle.

The basic characteristic bundle (basic WAB) and the service characteristic bundle (service WAB) are collectively named as Bundles, which belong to a Web layer concept on an OSGI architecture in a J2EE server, and may be Bundles based on Spring-DM frame or Felix frame in practical application. The basic WAB (Web Application Bundle, WAB) is loaded by a loading module, and mainly provides basic resources displayed on a Web layer, such as characters, colors, lines, static documents, HTTP web pages, images, sound files and so on; and the service WAB is extracted from the Web layer according to the specific service requirement, has an independent life cycle and a class loader, may be mounted on one basic WAB or simultaneously mounted on multiple basic WABs, and forms an interface meeting the specific service requirement by using the basic resource of the basic WAB, such as a service WAB for completing edition of a menu bar or a service WAB for providing a drawing tool action bar. In addition to using the resource in the basic WAB, the service WAB may also carry the resources which are not available in the basic WAB, such as unique menu logo, audio files and so on.

S1002, obtaining existing basic characteristic bundles and service characteristic bundles, and screening out the service characteristic bundle having a mounting identifier identical to the basic characteristic bundle identifier obtained from the Web resource request; wherein the mounting identifier is stored in the service characteristic bundle for designating a basic characteristic bundle to which the service characteristic bundle is to be mounted.

The basic WAB and the service WAB in the current frame are registered in BundleContext of an OSGi frame. When the loading module fails to load the required resource from the basic WAB according to the Web resource request, the loading module forwards the Web resource request to a delegation module, and the delegation module obtains the basic WAB identifier and the resource request path from the Web resource request; and the delegation module screens the basic WAB and the service WAB obtained from the BundleContext according to the mounting identifier Host-War, wherein, when the mounting identifier Host-War in the service WAB is identical to the basic WAB identifier obtained from the Web resource request, the service WAB passes screening.

The mounting means that the service characteristic bundle realizes specific service presentation of the Web layer by using the resource of the basic characteristic bundle, the designated path of the service characteristic resource placed in the service characteristic bundle may be automatically loaded when a web page is presented, and the path is decided by a code of the web page and is generally in a html file.

S1003, loading the screened service characteristic bundle according to the resource request path, and returning the obtained resource.

The screened service WABs may be multiple service WABs of different categories, namely service WABs created for meeting different service requirements in the Web layer, and may also be multiple homogeneous service WABs with different priorities. When the loading module calls the delegation module, the loading module transfers the basic WAB identifier and the resource request path. The resource request path designates the path of the resource to be obtained in the service WABs, and for the different service WABs, the path determines the service WAB owning the required resource; for the screened service WABs with different priorities, the service WABs form a service WAB group, and a priority identifier associate-rank is stored in a manifest file MANIFEST.MF of each service WAB, and the service characteristic bundles in the service characteristic bundle group are ordered according to priority through the priority identifiers; and the delegation module loads the required resource to each service characteristic bundle which has completed priority ordering in the service characteristic bundle group according to the resource request path, and returns the earliest obtained resource to provide but not limited to the updating capability of the service WAB. When the service WAB does not have the priority identifier and has had a service characteristic bundle capable of providing the required resource through the resource request path and the service WAB is subsequently uploaded and updated, the original service WAB is further required to be deleted.

Figure 2:
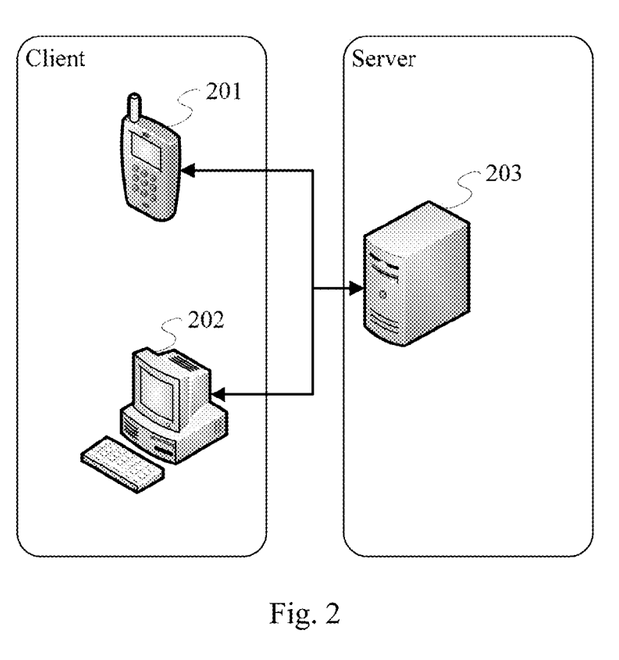
FIG. 2 is a network architecture diagram of a Web server applicable to the present invention.
Figure 3:
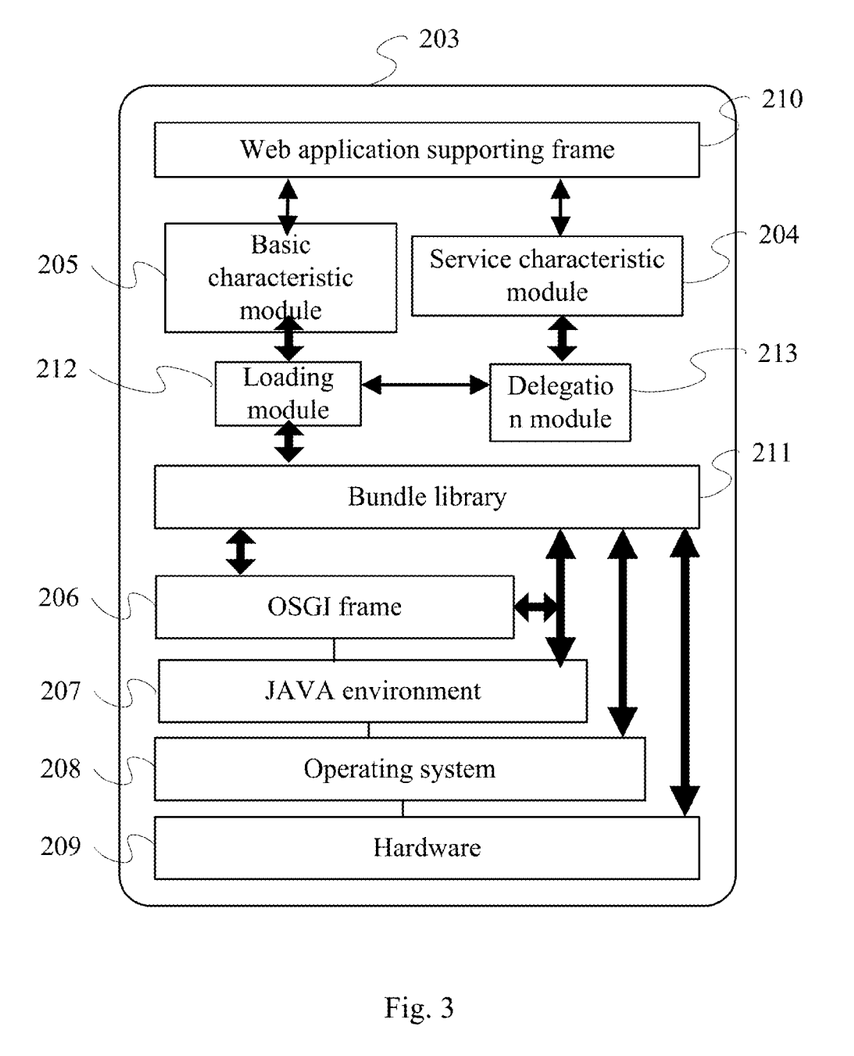
FIG. 3 is a structural diagram of a system for modularized management of service characteristics of the present invention.

An embodiment of a system for modularized management of service characteristics of the present invention is shown in FIG. 2 and FIG. 3. In this embodiment, the service characteristic bundle is specifically a service WAB, and the basic characteristic bundle is specifically a basic WAB, which will be specifically described as follows.

A service characteristic module 204 is configured to store a service characteristic bundle, where the service characteristic bundle has a mounting identifier indicating a basic characteristic bundle to which the service characteristic bundle is to be mounted.

The service WAB is mainly used for providing service USLs, Conversation configuration, menu material resources and so on.

A basic characteristic module 205 is configured to store the basic characteristic bundle, the basic characteristic bundle comprises a basic resource required by the service characteristic bundle.

The basic WAB is mainly used for providing Web display resources and resources which support XML and further comprise platform themes, expanded themes, platform USLs and Business Conversation.

A Bundle library 211 comprises a service Bundle, a platform Bundle and a third-party Bundle; the service Bundle provides the function realization of a service logic layer; the platform Bundle provides an interface of a corresponding platform; and the third-party Bundle is a standard class library provided by a third party.

A loading module 212 is configured to receive a Web resource request, and obtain a basic characteristic bundle identifier and a resource request path, the resource request path being a path of a resource to be obtained in the service characteristic bundle; load the basic characteristic bundle according to the Web resource request and call a delegation module to further complete loading of the resource when failing to load the required resource in the basic characteristic bundle; and configured to load, unload and update the basic characteristic bundle and the bundle library, and further call the delegation module to search the service characteristic module for the required resource when the corresponding resource is not obtained.

The delegation module 213 is configured to obtain existing basic characteristic bundles and service characteristic bundles, and screen out the service characteristic bundle having the mounting identifier identical to the basic characteristic bundle identifier obtained from the Web resource request, and load the screened service characteristic bundle based on the resource request path, and obtain and return the resource to the loading module.

The Bundle library 211 is loaded by an OSGI frame 206 based on a JAVA environment 207 to complete the construction of a service layer and a data layer such as service logic, message drive, message interfaces, object interfaces of a Web server, and the loading module 212 and the delegation module 213 are also loaded to a memory when the Web service layer is constructed. Both the service characteristic module 204 and the basic characteristic module 205 are stored in a physical memory, and are configured to store a service WAB and a basic WAB respectively; in the network architecture, the Web server 203 may be connected to a mobile phone terminal 201 or a personal computer (PC) terminal 202 or other terminal equipment such as a personal digital assistant (PDA) and so on; and when the terminal logs in the Web server through a browser to browse a web page, the Web server loads the resource to present Web contents of the corresponding web page to the terminal. The process is specifically as follows: when the terminal initiates an http access request, the access request is transmitted layer by layer through hardware 209, operating system 208, JAVA environment 207 and OSGI frame 206 of the Web server, and finally, a Web application supporting frame 210 is generated through the basic WAB and the service WAB and displayed in the browser of the terminal; and the Bundle library which has been loaded and runs in the memory may cover each level of the Web server, and may interact with the hardware, the operating system, the JAVA environment or the OSGI frame.

Figure 4:
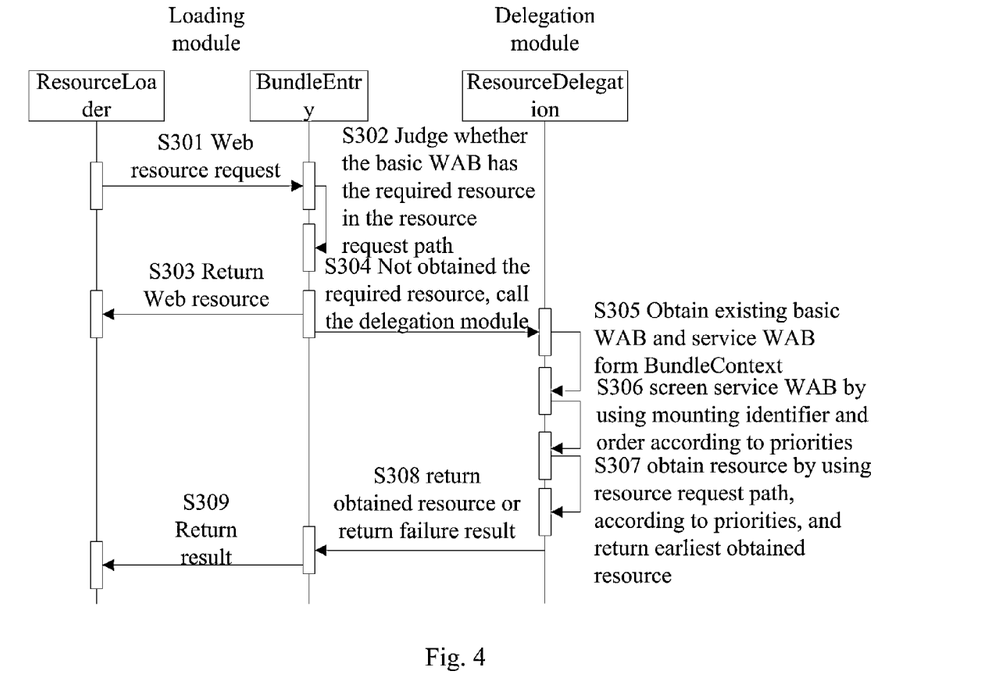
FIG. 4 is a signaling flowchart of a method for modularized management of service characteristics of the present invention.

An embodiment of a modularized management method for service characteristics based on a Spring-DM frame of the present invention is shown in FIG. 4. In this embodiment, the service characteristic bundle is specifically a service WAB, the basic characteristic bundle is expressed as a basic WAB, and the mounting identifier is expressed as Host-War. Firstly, the service WAB is generated, specifically comprising: generating a file according to architecture characteristics of a Bundle, constructing a resource based on service characteristics, and adding a basic characteristic bundle identifier to which the service characteristic bundle is to be mounted, serving as the Host-War, in MANIFEST.MF. This embodiment is specifically realized as follows.

S301, forwarding, by a resource loading function ResourceLoader in a loading module, a Web resource request message to a bundle entry module BundleEntry. The specific generating process of the Web resource request may be as follows: opening, by a user, a Web page of a server end; obtaining, by the server, an HTTP request for loading the corresponding Web page; and initiating, by the loading module, a Web resource request when the server runs a Web resource loading instruction in the HTTP request, wherein the Web resource request comprises the basic WAB and a resource request path, and the resource request path is the path of a resource required to be loaded.

S302, judging, by a bundle entry function BundleEntry in the loading module, whether an existing basic WAB stored in the basic characteristic module has the resource required in the Web resource request. The specific operation comprises: if the required resource is obtained from the basic WAB, operating S303; if the required resource is not obtained, operating S304, and calling a delegation module to further complete loading of the resource.

S303, returning the Web resource obtained by the bundle entry function BundleEntry to the resource loading function ResourceLoader; and completing, by the loading module, resource loading of the current module, wherein, the Web resource comprises characters, colors, lines, static documents, HTTP web pages, images, sound files and so on.

S304, if the required resource is not found in the basic WAB of an existing service Bundle library, calling the delegation module, and sending the Web resource request message carrying the basic WAB and the request path to a delegation loading function ResourceDelegation in the delegation module.

S305, obtaining, by the delegation loading function ResourceDelegation, the basic WAB and the service WAB through a BundleContext in a Spring-DM frame. Screening is performed according to the mounting identifier Host-War and the basic WAB version configured in the MANIFEST.MF file of the service WAB when the service WAB is created to obtain the service WAB mounted to the basic WAB in the resource request, wherein the screening process specifically comprises: checking whether the mounting identifier Host-War of the service characteristic bundle is the same as the identifier of the basic WAB; and checking whether the version is the same as the version of the basic WAB, wherein, when the identifiers and the versions are the same as that of the basic WAB, the screening succeeds; otherwise, the screening fails.

Further, when there are multiple service WABs obtained by screening the associated Bundles, a service WAB group or a service WAB list is generated by the obtained multiple service WABs; the following operation is performed on the basis of the condition that the service WAB group is obtained.

S306, reordering, by the delegation module, the service WABs in the service WAB group obtained in S305 according to a priority of the service WABs such as from high to low.

Specifically, the priority identifier associate-rank of each service WAB is obtained from the MANIFEST.MF file of each service WAB, and then the service WABs in the service WAB group are ordered in descending order according to the associate-rank values.

S307, sequentially loading, by the delegation module, the service WABs in the service WAB group in which the service WABs are reordered in S306 according to the resource request path, and determining whether the resource of the current service WAB is still on the resource request path; if it is determined that the corresponding resource in the current loaded service WAB does not exist, loading the next service WAB in the service WAB group until the corresponding service WAB is loaded, and obtaining the resource in the loaded service WAB or ending the loading when the resource is not obtained after all the service WABs in the service WAB group are loaded.

S308-S309, returning the resource obtained in S307 or a resource return message indicating failure to obtain the resource, and forwarding the resource obtained or the resource return message to a resource loading function ResourceLoader of the loading module through a bundle entry function BundleEntry.

Further, when homogeneous service characteristic bundles having higher priorities and carrying mounting identifiers identical to the mounting identifier in the service characteristic bundle group are uploaded, in the following resource loading process, for example, when the user updates the current web page or logs in the web page related to the service characteristic bundles again, the web server newly calls the aforementioned loading process and will generate new service WABs ordered according to priority for the changed service WAB group in the step S306, and the delegation module sequentially loads the service characteristic bundles in the service characteristic bundle group according to the resource request path and returns the earliest obtained resource in the step 307.

Further, when the homogeneous service WABs are deleted, in the following resource loading process, for example, when the user updates the current web page or logs in the web page related to the service characteristic bundles again, the web server newly calls the aforementioned loading process and will generate new service WABs ordered according to priority for the changed service WAB group in the step S306, and the delegation module sequentially loads the service characteristic bundles in the service characteristic bundle group according to the resource request path and returns the earliest obtained resource in the step 307.

Through this embodiment, the service WAB is based on the Spring-DM frame of the J2EE environment and owns a class loader and a life cycle, so remote independent deployment may be realized through a console or other input equipment by using a network, and the deployment comprises installation, start, stop and unloading. Further, dynamic upgrade and dynamic restoration may also be realized. The service WAB is generated according to the structures of modules, is not called by other service characteristic bundles as a terminal of the web layer and is loaded through the delegation module, so when the service WAB is restored and upgraded, the basic WAB and the other service characteristic bundles will not be affected at the same time.

Through this embodiment, because a priority identifier is introduced, the expanded service characteristic bundle management system may support a deployment and coverage strategy of one basic WAB matched with N service WABs, which meets the scheme requirements for higher customizability and less version maintenance.

Figure 5:
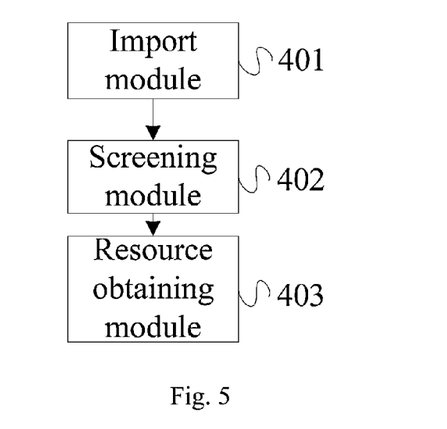
FIG. 5 is a structural schematic view of a delegation module for modularized management of service characteristics of the present invention.

An embodiment of a delegation module for an expanded service characteristic bundle of the present invention is shown in FIG. 5. In this embodiment, the basic characteristic bundle is expressed as a basic WAB, and the service characteristic bundle is expressed as a service WAB. The delegation module specifically comprises the following modules.

An import module 401 is configured to receive a basic characteristic bundle identifier and a resource request path of a resource in a service characteristic bundle, which are transmitted by a loading module.

A screening module 402 is configured to receive associated Bundles transmitted by the import module, and screen out the service characteristic bundle mounted to the basic characteristic bundle according to a mounting identifier.

The screening module obtains existing basic WABs and service WABs in the current frame from BundleContext by using a getBundleContext().getBundle() function, searches whether a MANIFEST.MF file has the mounting identifier Host-War, may further determine that the version in the MANIFEST.MF file is the same as the version of the basic WAB when it is determined that the mounting identifier Host-War exists and the mounting identifier is the same as the basic WAB identifier transmitted in the resource request, records the service WAB satisfying the aforementioned condition as the service WAB to be mounted to the basic WAB in the resource request, and forwards the service WAB to a resource obtaining module; wherein, the screening sequence of the version and the Host-War may be adjusted according to the actual condition.

Further, when each service WAB is also provided with a priority identifier, the screening module further generates a service WAB group through the service WABs, orders the service WABs in the service WAB group according to priority, and forwards the service WAB group to a resource obtaining unit.

The resource obtaining module 403 is configured to obtain the resource of the service WAB, wherein, the resource is required to be in the request path of the service WAB, and the request path is forwarded by the import module.

The resource obtaining module obtains the service WAB group from the screening module, sequentially loads the service WABs in the service WAB group according to the request path and according to a priority sequence such as from high to low, and returns the earliest obtained resource, wherein the resource may be USLs, Conversations configuration and layout of menu materials.

What is claimed is:
1. A method for managing service characteristics, comprising:
   obtaining, by a Web server, according to a Web resource request, a basic characteristic bundle identifier and a resource request path, wherein the resource request path is a path of a resource to be obtained in a service characteristic bundle;
   obtaining existing basic characteristic bundles and service characteristic bundles;
   screening out the service characteristic bundle by checking whether the service characteristic bundle has a mounting identifier identical to the basic characteristic bundle identifier; wherein the mounting identifier is stored in the service characteristic bundle for designating a basic characteristic bundle to which the service characteristic bundle is to be mounted; and loading the screened service characteristic bundle and obtaining the resource according to the resource request path, and returning the obtained resource.

2. The method according to claim 1, wherein the service characteristic bundle is further set with a priority identifier, and the method further includes:
screening out service characteristic bundles according to the mounting identifier, wherein the service characteristic bundles form a service characteristic bundle group; and
reordering the service characteristic bundles in the service characteristic bundle group according to priority through the priority identifier, so that the service characteristic bundles of the service characteristic bundle group are sequentially loaded according to the resource request path, and returning the earliest obtained resource.

3. The method according to claim 1, wherein the screening out the service characteristic bundle by checking whether the service characteristic bundle has a mounting identifier identical to the basic characteristic bundle identifier further comprises:
screening the obtained service characteristic bundles using a version number of the basic characteristic bundle to which the service characteristic bundle is to be mounted, which is stored in the service characteristic bundle, wherein the screening is successful when the stored version number is identical to a version number of the basic characteristic bundle determined according to the basic characteristic bundle identifier.

4. The method according to claim 2, further comprising:
reordering service characteristic bundles in the changed service characteristic bundle group according to priority when homogeneous service characteristic bundles have higher priorities and carry mounting identifiers identical to the mounting identifier in the service characteristic bundle group are uploaded, and loading the service characteristic bundles sequentially according to the resource request path, and returning the earliest obtained resource.

5. The method according to claim 2, further comprising:
reordering service characteristic bundles in the changed service characteristic bundle group according to priority when a service characteristic bundle in the service characteristic bundle group is deleted, and loading the service characteristic bundles sequentially according to the resource request path, and returning the earliest obtained resource.

6. The method according to claim 1, further comprising:
creating the service characteristic bundle,
generating a manifest file according to architecture characteristics of bundles,
constructing the resource based on service characteristics, and
adding the basic characteristic bundle identifier to which the service characteristic bundle is to be mounted as the mounting identifier to the manifest file.

7. A management system for a service characteristic bundle, comprising a processor and a non-transitory processor-readable medium having processor-executable instructions stored thereon, the processor-executable instructions when executed on the processor cause the management system to:
store a service characteristic bundle, wherein the service characteristic bundle has a mounting identifier indicating a basic characteristic bundle to which the service characteristic bundle is to be mounted; and
store a basic characteristic bundle, wherein the basic characteristic bundle comprises a basic resource required by the service characteristic bundle; and
receive a Web resource request, and obtain a basic characteristic bundle identifier and a resource request path, wherein the resource request path is a path of a resource to be obtained in the service characteristic bundle, and load the basic characteristic bundle according to the Web resource request and complete loading of the resource when the required resource is not loaded in the basic characteristic bundle; and
obtain existing basic characteristic bundles and service characteristic bundles, and screen out the service characteristic bundle by checking whether the service characteristic bundle has the mounting identifier identical to the basic characteristic bundle identifier, and load the screened service characteristic bundle based on the resource request path, and obtain and return the resource.

8. The system according to claim 7, wherein the processor-executable instructions when executed on the processor further cause the management system to:
screen the obtained service characteristic bundles using a version number of the basic characteristic bundle to which the service characteristic bundle is to be mounted, which is stored in the service characteristic bundle, wherein the screening is successful when the stored version number is identical to a version number of the basic characteristic bundle determined according to the basic characteristic bundle identifier.

9. The system according to claim 8, wherein the management system is further set with a priority identifier, and the processor-executable instructions when executed on the processor cause the management system to:
screen out service characteristic bundles according to the mounting identifier, wherein the service characteristic bundles form a service characteristic bundle group, and the service characteristic bundles in the service characteristic bundle group are reordered according to a priority according to the priority identifier; and
obtain the resource of each service characteristic bundle from each service characteristic bundle which has been ordered according to priority in the service characteristic bundle group according to the request path, and return the earliest obtained resource.

10. The system according to claim 9, wherein the processor-executable instructions when executed on the processor further cause the management system to:
reorder, in the service characteristic bundle group, the service characteristic bundles according to the priority when homogeneous service characteristic bundles have higher priorities and carry mounting identifiers identical to the mounting identifier in the service characteristic bundle group are uploaded; and load the service characteristic bundles sequentially according to the resource request path; and return the earliest obtained resource.

11. The system according to claim 9, wherein the processor-executable instructions when executed on the processor further cause the management system to:
reorder, in the service characteristic bundle group, the service characteristic bundles according to the priority when service characteristic bundles are deleted; and load the service characteristic bundles sequentially according to the resource request path; and return the earliest obtained resource.

12. A device for managing a service characteristic bundle, comprising a processor and a non-transitory processor-readable medium having processor-executable instructions stored thereon, the processor-executable instructions when executed on the processor cause the device to:
   receive a basic characteristic bundle identifier and a resource request path of a resource in a service characteristic bundle; and
   obtain existing basic characteristic bundles and service characteristic bundles and screen out the service characteristic bundle by checking whether the service characteristic bundle has a mounting identifier identical to the basic characteristic bundle identifier, wherein the mounting identifier is stored in the service characteristic bundle for designating a basic characteristic bundle to which the service characteristic bundle is to be mounted; and
   obtain the resource of the service characteristic bundle according to the resource request path and return the obtained resource.

13. The device according to claim 12, wherein the processor-executable instructions when executed on the processor further cause the device to:
   screen the obtained service characteristic bundles using a version number of the basic characteristic bundle to which the service characteristic bundle is to be mounted, which is stored in the service characteristic bundle, wherein the screening is successful when the stored version number is identical to a version number of the basic characteristic bundle determined according to the basic characteristic bundle identifier.

14. The device according to claim 12, wherein the device is set with a priority identifier, and the processor-executable instructions when executed on the processor further cause the device to:
   screen out service characteristic bundles according to the mounting identifier, wherein the service characteristic bundles form a service characteristic bundle group; and
   reorder the service characteristic bundles in the service characteristic bundle group according to the priority identifier.

15. The device according to claim 14, wherein the processor-executable instructions when executed on the processor further cause the device to:
   sequentially load each service characteristic bundle in the service characteristic bundle group according to the resource request path, and return the earliest obtained resource.

* * * * *